(12) United States Patent
Fang et al.

(10) Patent No.: US 11,760,605 B2
(45) Date of Patent: Sep. 19, 2023

(54) ELEVATOR DOOR MONITORING SYSTEM, ELEVATOR SYSTEM AND ELEVATOR DOOR MONITORING METHOD

(71) Applicant: Otis Elevator Company, Farmington, CT (US)

(72) Inventors: Hui Fang, Shanghai (CN); Zhen Jia, Shanghai (CN); Walter Thomas Schmidt, Marlborough, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1154 days.

(21) Appl. No.: 16/421,016

(22) Filed: May 23, 2019

(65) Prior Publication Data
US 2019/0359451 A1  Nov. 28, 2019

(30) Foreign Application Priority Data
May 23, 2018 (CN) .......................... 201810500352.1

(51) Int. Cl.
*B66B 13/26* (2006.01)
*B66B 5/02* (2006.01)
(Continued)

(52) U.S. Cl.
CPC ............ *B66B 13/26* (2013.01); *B66B 5/0031* (2013.01); *B66B 5/02* (2013.01); *B66B 13/146* (2013.01);
(Continued)

(58) Field of Classification Search
CPC ......... B66B 13/26; B66B 5/0031; B66B 5/02; B66B 13/146; B66B 1/3415; G06V 10/28;
(Continued)

(56) References Cited

U.S. PATENT DOCUMENTS

| | | |
|---|---|---|
| 5,387,768 A | 2/1995 | Izard et al. |
| 6,973,998 B2 | 12/2005 | Deplazes et al. |

(Continued)

FOREIGN PATENT DOCUMENTS

| | | |
|---|---|---|
| CN | 101585478 A | 11/2009 |
| CN | 101734537 A | 6/2010 |

(Continued)

OTHER PUBLICATIONS

Chinese Office Action for Application No. 201810500352.1; dated Aug. 2, 2021; 9 Pages.

*Primary Examiner* — Jeffrey Donels
(74) *Attorney, Agent, or Firm* — CANTOR COLBURN LLP

(57) ABSTRACT

The present invention relates to a system for monitoring an elevator door, an elevator system, and a method for monitoring an elevator door. The elevator door has an open state or a closed state implemented by moving along an elevator sill. The system for monitoring an elevator door includes: one or more imaging sensors configured to collect image data and depth data of at least one section in the elevator sill that is exposed when the elevator door is in the open state; and a data processing device in communication with the imaging sensor and configured to receive and process the image data and the depth data to determine whether an obstacle preventing the elevator door from entering the closed state exists in the section. By applying the present invention, the safety of the elevator door can be improved effectively, and equipment property losses and personal injuries can be avoided.

19 Claims, 3 Drawing Sheets

(51) Int. Cl.
  *B66B 13/14* (2006.01)
  *B66B 5/00* (2006.01)
  *G06V 20/52* (2022.01)
  *G06V 10/56* (2022.01)
  *G06V 10/30* (2022.01)
  *G06V 10/28* (2022.01)
  *G06V 20/64* (2022.01)

(52) U.S. Cl.
  CPC .............. *G06V 10/28* (2022.01); *G06V 10/30* (2022.01); *G06V 10/56* (2022.01); *G06V 20/52* (2022.01); *G06V 20/64* (2022.01); *G05B 2219/45242* (2013.01)

(58) Field of Classification Search
  CPC ........ G06V 10/30; G06V 10/56; G06V 20/52; G06V 20/64; G05B 2219/45242
  See application file for complete search history.

(56) References Cited

U.S. PATENT DOCUMENTS

| | | |
|---|---|---|
| 7,140,469 B2 | 11/2006 | Deplazes et al. |
| 8,672,098 B2 | 3/2014 | Kashiwakura et al. |
| 8,955,253 B2 | 2/2015 | Kanki et al. |
| 9,212,028 B2 | 12/2015 | Novak |
| 10,491,885 B1* | 11/2019 | Hicks ...................... G06V 20/56 |
| 2013/0075201 A1 | 3/2013 | Lee et al. |
| 2019/0352136 A1* | 11/2019 | Fang ....................... B66B 13/08 |

FOREIGN PATENT DOCUMENTS

| | | |
|---|---|---|
| CN | 101759083 A | 6/2010 |
| CN | 101891102 A | 11/2010 |
| CN | 102159488 A | 8/2011 |
| CN | 102241354 A | 11/2011 |
| CN | 203237899 U | 10/2013 |
| CN | 205397758 U | 7/2016 |
| CN | 106966275 A | 7/2017 |
| CN | 107000982 A | 8/2017 |
| CN | 107298354 A | 10/2017 |
| CN | 107337044 A | 11/2017 |
| EP | 2298686 A1 | 3/2011 |
| JP | 2002265175 A | 9/2002 |
| JP | 2006089190 A | 4/2006 |
| JP | 2011241044 A | 12/2011 |
| WO | 2010073387 A1 | 7/2010 |
| WO | 2016113564 A1 | 7/2016 |

* cited by examiner

ELEVATOR DOOR MONITORING SYSTEM, ELEVATOR SYSTEM AND ELEVATOR DOOR MONITORING METHOD

FOREIGN PRIORITY

This application claims priority to Chinese Patent Application No. 201810500352.1, filed May 23, 2018, and all the benefits accruing therefrom under 35 U.S.C. § 119, the contents of which in its entirety are herein incorporated by reference.

TECHNICAL FIELD

The present invention relates to the field of elevator technologies, and in particular, to a system for monitoring an elevator door, an elevator system, and a method for monitoring an elevator door.

BACKGROUND

Elevators have been widely used in modern society, and have brought great convenience to people's work and daily life. A large number of and various types of elevator devices, equipment or systems have been provided in the prior art to meet different application requirements of people. However, the existing elevator devices, equipment or systems still have disadvantages and shortcomings in such aspects as safety and reliability, system performance, and intelligent monitoring, and can be further improved and optimized.

SUMMARY OF THE INVENTION

In view of this, a system for monitoring an elevator door, an elevator system, and a method for monitoring an elevator door are provided for solving or at least alleviating the foregoing problems in the prior art and one or more of problems in other aspects.

First of all, according to a first aspect of the present invention, a system for monitoring an elevator door is provided, the elevator door having an open state or a closed state implemented by moving along an elevator sill, wherein the system for monitoring an elevator door includes: one or more imaging sensors configured to collect image data and depth data of at least one section in the elevator sill that is exposed when the elevator door is in the open state; and a data processing device in communication with the imaging sensor(s) and configured to receive and process the image data and the depth data to determine whether an obstacle preventing the elevator door from entering the closed state exists in the section.

In the system for monitoring an elevator door according to the present invention, optionally, the data processing device includes a first module and a second module configured to respectively process the image data and the depth data to separately judge whether an obstacle exists in the section, and the data processing device is configured to determine that the obstacle has existed in the section when a judgment result of the first module or the second module is affirmative.

In the system for monitoring an elevator door according to the present invention, optionally, the data processing device further includes a third module configured to make a combined judgment on the judgment result of the first module and the judgment result of the second module, and the data processing device is configured to determine that the obstacle has existed in the section when the combined judgment result of the third module is affirmative.

In the system for monitoring an elevator door according to the present invention, optionally, the combined judgment includes: weighting the judgment result of the first module and the judgment result of the second module, and making an affirmative combined judgment result when the value obtained by the weighting exceeds a preset value; or comparing the confidence of the judgment result based on the image data with the confidence of the judgment result based on the depth data, and selecting the judgment result with the higher confidence as the combined judgment result.

In the system for monitoring an elevator door according to the present invention, optionally, the image data is processed with color background modeling, foreground detection and morphological filtering by the first module, and/or the depth data is processed with 3D background structural modeling, background subtraction and morphological filtering by the second module.

In the system for monitoring an elevator door according to the present invention, optionally, the data processing device is configured to output a signal when determining that the obstacle exists in the section.

In the system for monitoring an elevator door according to the present invention, optionally, the system for monitoring an elevator door further includes a control processing device in communication with the data processing device and configured to start a processing operation after receiving the signal, and the processing operation includes at least one of the following: prohibiting the elevator door from moving; alerting a passenger in an elevator car; reminding the passenger in the elevator car to remove the obstacle; sending a working staff a notification that an obstacle exists in the section; and publishing in an announcement area the notification that an obstacle exists in the section.

In the system for monitoring an elevator door according to the present invention, optionally, the signal is transmitted to a control system for controlling the operation of an elevator to perform a processing operation, and the processing operation includes at least one of the following: prohibiting the elevator door from moving; alerting a passenger in an elevator car; reminding the passenger in the elevator car to remove the obstacle; sending a working staff a notification that an obstacle exists in the section; and publishing in an announcement area the notification that an obstacle exists in the section.

In the system for monitoring an elevator door according to the present invention, optionally, the imaging sensor(s) is/are arranged at the top of an elevator car, at the bottom of the elevator car, in an elevator door frame and/or in an elevator waiting area.

In the system for monitoring an elevator door according to the present invention, optionally, the elevator door is at least one of a landing door and a car door.

In the system for monitoring an elevator door according to the present invention, optionally, the imaging sensor(s) include(s) an RGB-D sensor.

Next, according to a second aspect of the present invention, an elevator system is provided, wherein the elevator system includes the system for monitoring an elevator door according to any of the foregoing.

In addition, according to a third aspect of the present invention, a method for monitoring an elevator door is further provided, the elevator door having an open state or a closed state implemented by moving along an elevator sill, wherein the method for monitoring an elevator door includes steps of: acquiring a current state of the elevator door;

collecting image data and depth data of at least one section in the elevator sill that is exposed when the current state of the elevator door is the open state; and processing the image data and the depth data to determine whether an obstacle preventing the elevator door from entering the closed state exists in the section.

In the method for monitoring an elevator door according to the present invention, optionally, it is determined that the obstacle has existed in the section when one of the following conditions is met: it is judged that the obstacle exists in the section during processing based on the image data; and it is judged that the obstacle exists in the section during processing based on the depth data.

In the method for monitoring an elevator door according to the present invention, optionally, the image data is processed by color background modeling, foreground detection and morphological filtering, and/or the depth data is processed by 3D background structural modeling, background subtraction and morphological filtering.

In the method for monitoring an elevator door according to the present invention, optionally, the step of processing the image data and the depth data includes: making a combined judgment on a judgment result based on the image data and a judgment result based on the depth data to determine that the obstacle exists in the section.

In the method for monitoring an elevator door according to the present invention, optionally, the combined judgment includes: weighting the judgment result based on the image data and the judgment result based on the depth data, and determining that the obstacle has existed in the section when the value obtained by the weighting exceeds a preset value; or comparing the confidence of the judgment result based on the image data with the confidence of the judgment result based on the depth data, and selecting the judgment result with the higher confidence as the combined judgment result.

In the method for monitoring an elevator door according to the present invention, optionally, the method for monitoring an elevator door further includes a step of: starting a processing operation when it is determined that the obstacle exists in the section, and the processing operation includes at least one of the following: prohibiting the elevator door from moving; alerting a passenger in an elevator car; reminding the passenger in the elevator car to remove the obstacle; sending a working staff a notification that an obstacle exists in the section; and publishing in an announcement area the notification that an obstacle exists in the section.

In the method for monitoring an elevator door according to the present invention, optionally, the image data and the depth data are collected by one or more imaging sensors, and the imaging sensor(s) include(s) an RGB-D sensor.

In the method for monitoring an elevator door according to the present invention, optionally, it is determined according to the image data and/or the depth data collected by the imaging sensor in real time whether the elevator door is already in the open state; or it is determined according to a signal acquired from a control device for controlling the operation of an elevator whether the elevator door is already in the open state.

Principles, characteristics, features, advantages, and the like of various technical solutions according to the present invention will be understood clearly from the following detailed description with reference to accompanying drawings. For example, it would be appreciated that the system for monitoring an elevator door, the elevator system, and the method for monitoring an elevator door which are designed and provided according to the present invention have obvious technical advantages compared with the prior art, and an obstacle in an area of an elevator sill that will prevent the elevator door from entering a closed state can be detected quickly and accurately. Thus, corresponding safety measures can be taken in time, thus effectively eliminating or reducing the problems related to the safety of the elevator door, and being very helpful to avoid equipment property losses and personal injuries.

BRIEF DESCRIPTION OF THE DRAWINGS

The technical solutions of the present invention will be described in detail in the following with reference to the accompanying drawings and embodiments. However, it should be noted that these accompanying drawings are designed merely for explanation and merely intended to conceptually illustrate structural constructions described here, and do not need to be drawn to scale.

DETAILED DESCRIPTION

First, it should be noted that structural compositions, steps, characteristics, advantages, and the like of a system for monitoring an elevator door, an elevator system, and a method for monitoring an elevator door according to the present invention will be illustrated in the following through examples. However, all descriptions should not be used to limit the present invention. The term "elevator sill" in this text may have a function of guiding the elevator door through, for example, a guide rail mounted in the elevator sill, and definitely, the elevator door can also be guided by means of, for example, some components or devices mounted above the elevator door rather than a guide rail mounted in the elevator sill.

Moreover, for any single technical feature described or implied in the embodiments involved in this text or any single technical feature shown or implied in each accompanying drawing, the present invention still allows these technical features (or equivalents thereof) to be randomly combined or deleted without any technical obstacles, and thus it should be considered that more embodiments according to the present invention also fall within the scope of this text. In addition, identical or similar parts and features may be marked at only one or several places in the same accompanying drawing to simplify the drawings.

Figure 1:
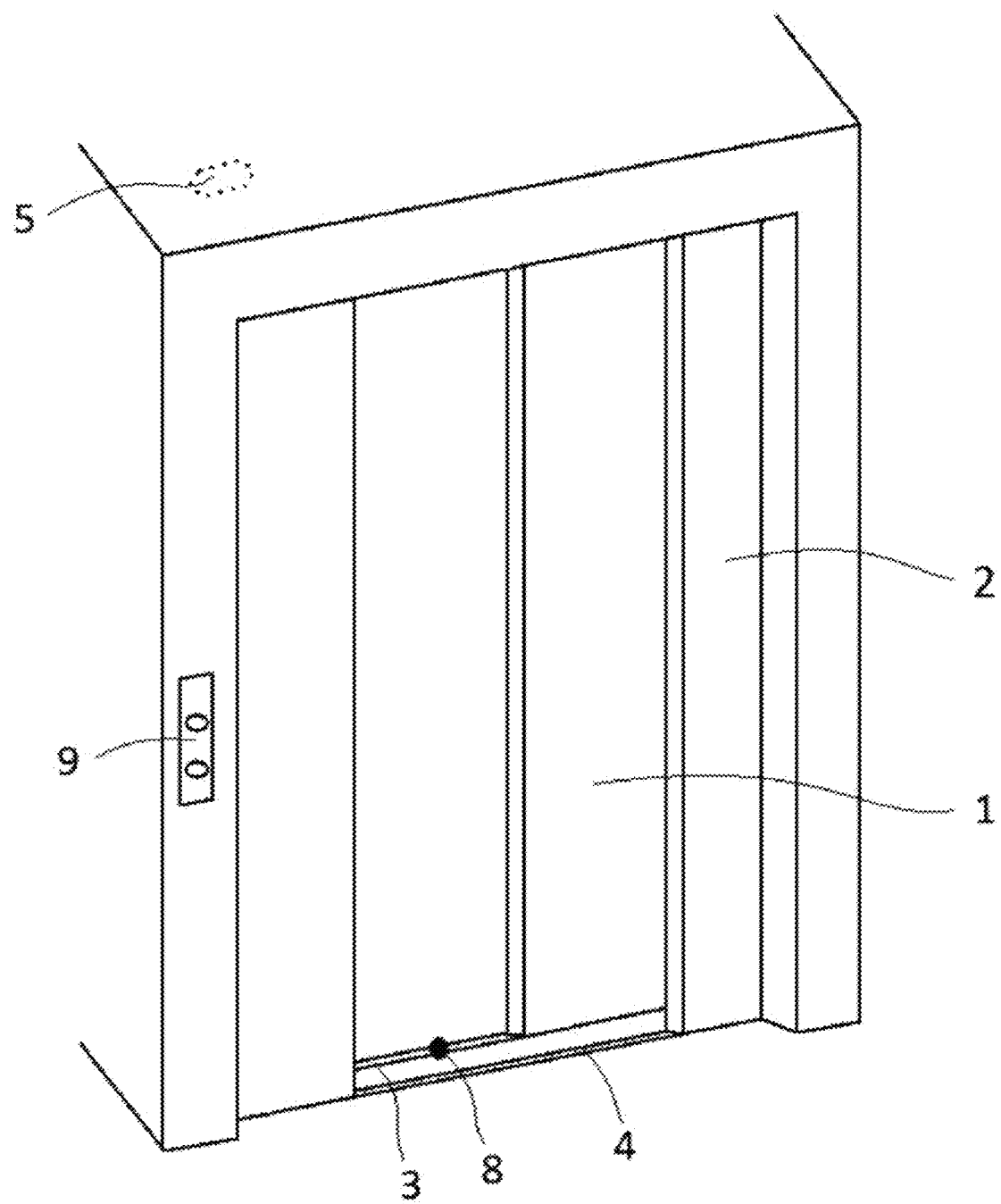
FIG. 1 is a partial schematic three-dimensional structural diagram of an elevator, showing a part of a system for monitoring an elevator door according to the present invention that is mounted to the elevator.
Figure 2:
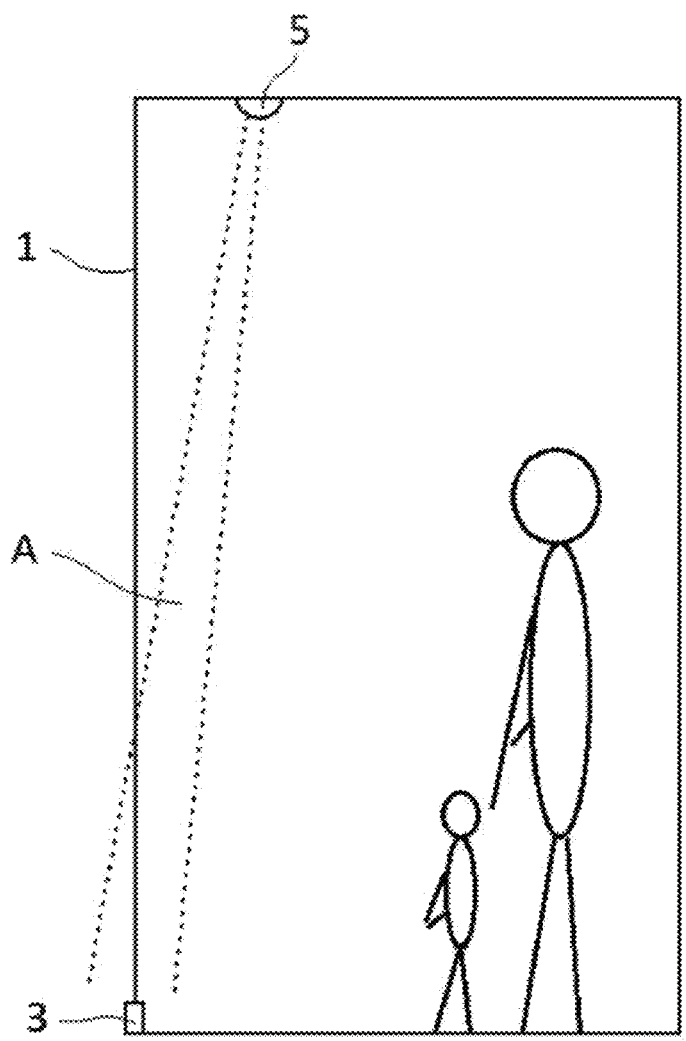
FIG. 2 is a partial schematic structural side view of the interior of a car of the elevator shown in FIG. 1.
Figure 3:
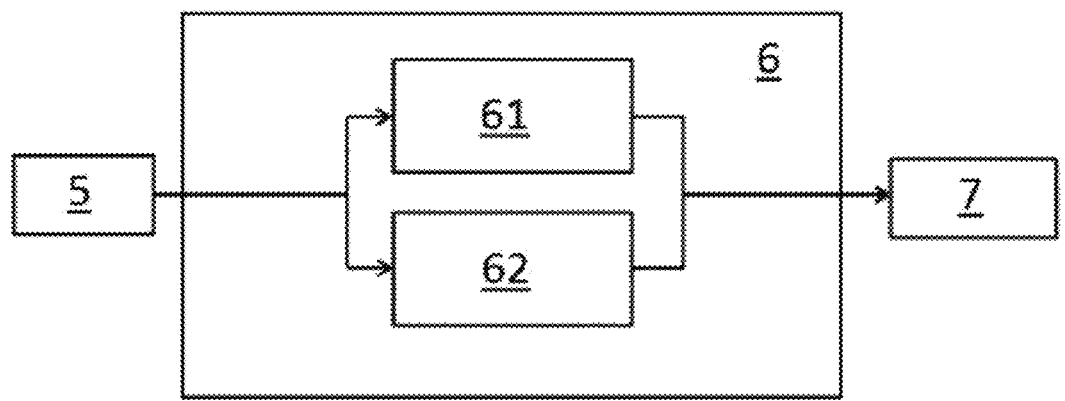
FIG. 3 is a schematic composition diagram of an embodiment of a system for monitoring an elevator door according to the present invention.
Figure 4:
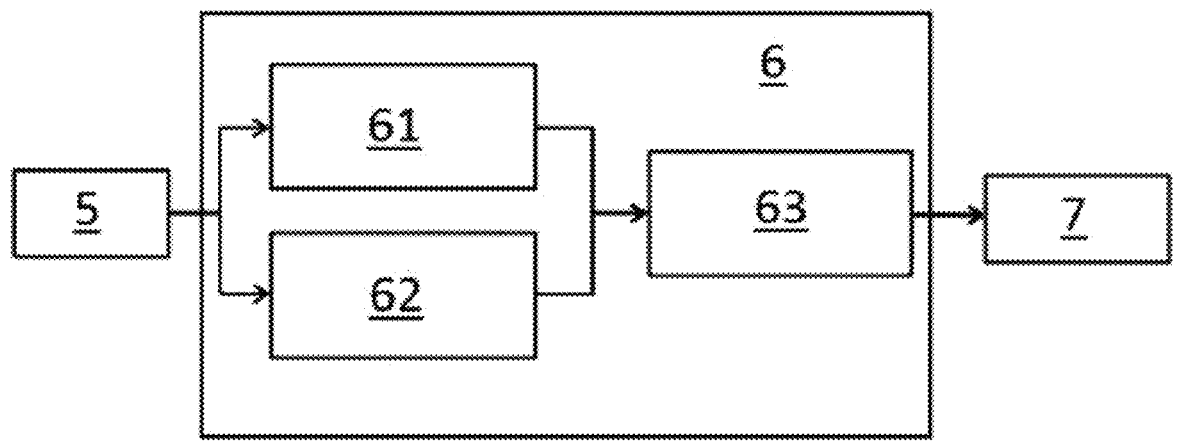
FIG. 4 is a schematic composition diagram of another embodiment of a system for monitoring an elevator door according to the present invention.

FIG. 1 shows a partial three-dimensional structure of an elevator schematically and roughly, on which a system for monitoring an elevator door according to the present invention is mounted. FIG. 2 further shows a partial structural side view of the interior of an elevator car. At the same time, FIG. 3 and FIG. 4 show compositions of two embodiments of a system for monitoring an elevator door, respectively.

Detailed description is provided in the following through the foregoing accompanying drawings.

First of all, as shown in FIG. 1, an elevator is generally provided with elevator doors that serve as a car door 1 and a landing door (also referred to as "lobby door") 2. They may be in a variety of forms such as center opening and side opening, and the car door 1 and the landing door 2 can be provided with elevator sills 3 and 4, respectively, so that an open state or a closed state is implemented when they move along their respective elevator sills 3 and 4. However, in some cases, the landing door 2 may be opened and closed by simply hoisting the landing door 2 onto a guide rail mounted above, instead of specially disposing the elevator sill 4 for the landing door 2 as shown in FIG. 1.

The inventor has found through researches that many elevator safety problems are actually caused by problems related to the elevator door. Among them, one of the important reasons for the failure or abnormality of the elevator door is the existence of an unexpected foreign object (such as a pebble, a key, and a card) in the elevator sill of the elevator door. This will affect smooth movement of the elevator door along the elevator sill, especially will prevent an elevator door that has been opened from entering the closed state, thus possibly damaging the elevator door and causing a serious safety problem. Undesirably, the foreign objects are usually small and dark colored, and they are difficult to be found and noticed, thus causing obstacles to the normal operation of the elevator door. For example, an obstacle 8 in the elevator sill 3 as shown in FIG. 1 may prevent the elevator door from closing normally and even damage the elevator door.

To this end, a system for monitoring an elevator door that may be implemented in many manners is provided in the present invention to effectively solve the foregoing technical problems. In a given example, the system for monitoring an elevator door includes an imaging sensor 5 and a data processing device 6. One or more imaging sensors 5 may be arranged at any suitable position such as at the top of an elevator car, at the bottom of the elevator car, in an elevator door frame and/or in an elevator waiting area (sometimes also referred to as "lobby"), for collecting image data and depth data of at least one section in the elevator sill 3 that is exposed when the elevator door is in the open state. The foregoing section may generally be a part of the elevator sill 3 in which a foreign object easily falls to form an obstacle preventing the normal operation of the elevator door. However, in some application scenarios, it is allowed in the present invention that image data and depth data are collected for all sections in the elevator sill 3 that can be exposed when the elevator door 1 is in the open state. As described in the foregoing, FIG. 2 shows that a field of vision A can be formed through the imaging sensor 5 mounted on the top of the elevator car to cover one section or all sections in the elevator sill 3 that can be exposed to collect image data and depth data.

As an example, graphic data and depth data can be collected and provided by the imaging sensor 5 using any appropriate parts, components or devices (such as commercially available ZED, Kinect, and Camcube) such as an RGB-D sensor. Such graphic data and depth data will be analyzed and processed by the data processing device 6. For example, height information of the foreign object can be acquired from the depth data for judgment, so as to determine whether an obstacle preventing the car door 1 from entering the closed state exists in a section of the elevator sill within the coverage of the field of vision A formed by the imaging sensor 5.

The data processing device 6 can communicate with the imaging sensor 5 wirelessly or in a wired manner to receive and process the image data and the depth data that are collected by the imaging sensor 5.

For example, in the embodiment of a system for monitoring an elevator door shown in FIG. 3, the data processing device 6 may include two modules, that is, a first module 61 and a second module 62 configured to process the image data and the depth data, respectively and then separately judge according to their respective data processing results whether an obstacle exists in a section of an elevator sill covered by the field of vision of the imaging sensor 5 and from which the imaging sensor 5 collects data. For the first module 61, the foregoing image data can be processed by any one or more appropriate image or video (streaming) analysis technologies including, but not limited to, color background modeling, foreground detection, morphological filtering, and so on. For the second module 62, the foregoing depth data can be processed by any one or more appropriate depth image or video (streaming) analysis technologies including, but not limited to, 3D analysis (such as 3D background structural modeling (such as a GMM method and a codebook method) and background subtraction), morphological filtering, and so on. Lots of processing methods for image data and depth data have been provided in the prior art, and these methods will not be elaborated in this text.

If the judgment result of either of the first module 61 and the second module 62 is that an obstacle existing in a current elevator sill can be confirmed, the data processing device 6 directly determines that an obstacle preventing the elevator door from operating normally and entering the closed state has existed in the section. In the foregoing manner, not only can the obstacle in the section of the elevator sill be monitored quickly and easily, but also the possibility of missing detection of such an obstacle can be minimized, thus effectively improving the safety and reliability of the operation of the elevator door and the whole elevator system.

For another example, FIG. 4 shows another embodiment of a system for monitoring an elevator door, wherein the data processing device 6 may include three modules, which are respectively a first module 61 configured to process collected image data, a second module 62 configured to process collected depth data, and a third module 63 configured to make a combined judgment on a judgment result of the first module 61 and a judgment result of the second module 62. The first module 61 and the second module 62 can process the collected image data and depth data in the data processing manner as discussed in the foregoing with reference to the example in FIG. 3. However, the collection and analysis on the image data and the collection and analysis on the depth data have respective limitations, which may lead to difficulties and deficiencies in monitoring of a foreign object, that is, an obstacle may be missed if only image data or depth data is applied.

For example, if there is no obvious difference between the color of the foreign object falling into the elevator sill and the color of the current elevator sill, there may be a problem in the analysis and processing based on, for example, the RGB color image data, that is, the foregoing foreign object cannot be analyzed and identified and a wrong judgment result that there is no obstacle in the section of the elevator sill is given. For another example, if the foreign object falling into the elevator sill is very thin, a depth difference between the foreign object and the elevator sill will be very small, and then there may be a problem in the method based on the depth data, that is, it is impossible to make a correct analysis and judgment and a wrong judgment result that there is no obstacle in the section of the elevator sill is given. Therefore, the foregoing third module 63 in the data processing device 6 can be used to make a combined judgment on the respective judgment results of the first module 61 and the second module 62, so as to eliminate these defects and deficiencies mentioned in the foregoing and provide a more accurate and reliable final judgment result. In other words, if the third module 63 determines that an obstacle exists in a monitored section of the current elevator sill after making combined judgment, the data processing device 6 can finally determine the existence of the obstacle accordingly, thus improving the accuracy and reliability of the judgment and analysis on the obstacle.

The third module 63 can make a combined judgment on the judgment result of the first module 61 and the judgment result of the second module 62 in many different manners. For example, the third module 63 can make a combined judgment based on analysis on the respective detection confidences of the first module 61 and the second module 62. Specifically, the confidence of the judgment result of the first module 61 may be based on the degree of color difference between a detected object and the background. For example, the greater the color difference is, the higher the confidence is. The confidence of the judgment result of the second module 62 may be based on the degree of distance difference between the detected object and the background. For example, the greater the distance difference is, the higher the confidence is. Then, the confidences of respective detection results of the first module 61 and the second module 62 are compared, and the judgment result of the module with the higher confidence is selected as a final confirmation result of the data processing device 6.

For another example, the third module 63 can process the judgment result of the first module 61 (for example, the probability of the existence of an obstacle determined by the first module 61 qualitatively with numerical processing) and the judgment result of the second module 62 (for example, the probability of the existence of an obstacle determined by the second module 62 qualitatively with numerical processing) in a weighting manner. Specific setting of a parameter such as a weighting factor can be selected and adjusted according to an actual application situation. If a value obtained after the weighting exceeds a preset value (which can be selected and set according to an actual application), the combined judgment result can be set as that an obstacle existing in the monitored section of the current elevator sill is confirmed.

Optionally, the system for monitoring an elevator door can be provided with a control processing device 7, and the data processing device 6 in the system for monitoring an elevator door is configured to output a signal when it has been determined that an obstacle exists in the section of the elevator sill, and thus transmit the signal to the foregoing control processing device 7. The control processing device 7 will start a processing operation after receiving the signal, thus taking a corresponding measure in time to avoid personnel injuries or damage to the elevator door and other related equipment. Such a processing operation can include one or more of the following measures: prohibiting the elevator door from moving; alerting (by text, sound, etc., or a combination thereof) a passenger in an elevator car; reminding the passenger in the elevator car to remove the obstacle that has been confirmed; sending a working staff (such as an elevator maintainer, a building manager, or security personnel) a notification that the obstacle exists in the elevator door (which can urge them to inspect or repair the elevator, etc.); and publishing in an announcement area (such as a lobby screen or an electronic screen in the elevator car) the notification that the obstacle exists in the section.

However, in some embodiments, the foregoing output signal of the data processing device 6 can also be transmitted to a control system for controlling the operation of the elevator, and the control system performs the processing operation as described in the foregoing or a similar processing operation, thus implementing protection in time and avoiding unnecessary personal injuries and property losses.

As described in the foregoing, when the car door 1 moves along the elevator sill 3 to be in an open state, there is a possibility that a foreign object falls into the elevator sill 3 to form an obstacle in this case, and thus it is necessary to detect obstacles in one section or all sections of the elevator sill 3. The image data and the depth data can be collected in real time by means of the imaging sensor 5, and it is very convenient to automatically detect and determine whether the car door 1 is currently in an open state by analyzing such image data and depth data separately or comprehensively. In addition, a signal can also be acquired directly from a control device for controlling the operation of the elevator to determine accordingly whether the car door 1 is in the open state. For example, after a passenger in an elevator waiting area presses an elevator button 9, the elevator will be scheduled by the foregoing control device to a floor where the waiting area is located and then opened. The elevator operation information, including the state of the elevator door, can be directly acquired from the control device.

In addition, it should also be noted that as shown in FIG. 1, when the landing door 2 is provided with the elevator sill 4, it can be detected in the same manner as described in the foregoing whether an obstacle preventing the landing door 2 in an open state from entering a closed state exists in one section or all sections of the elevator sill 4.

Contents such as substantial structural compositions, working principles, and technical advantages of the system for monitoring an elevator door according to the present invention have been illustrated in detail in the foregoing through the examples shown with reference to FIG. 1 to FIG. 4. According to another technical solution of the present invention, an elevator system is further provided, wherein the elevator system is provided with the system for monitoring an elevator door designed and provided according to the present invention, thus achieving the aforementioned obvious technical advantages of the solution in the present invention compared with the prior art.

Figure 5:
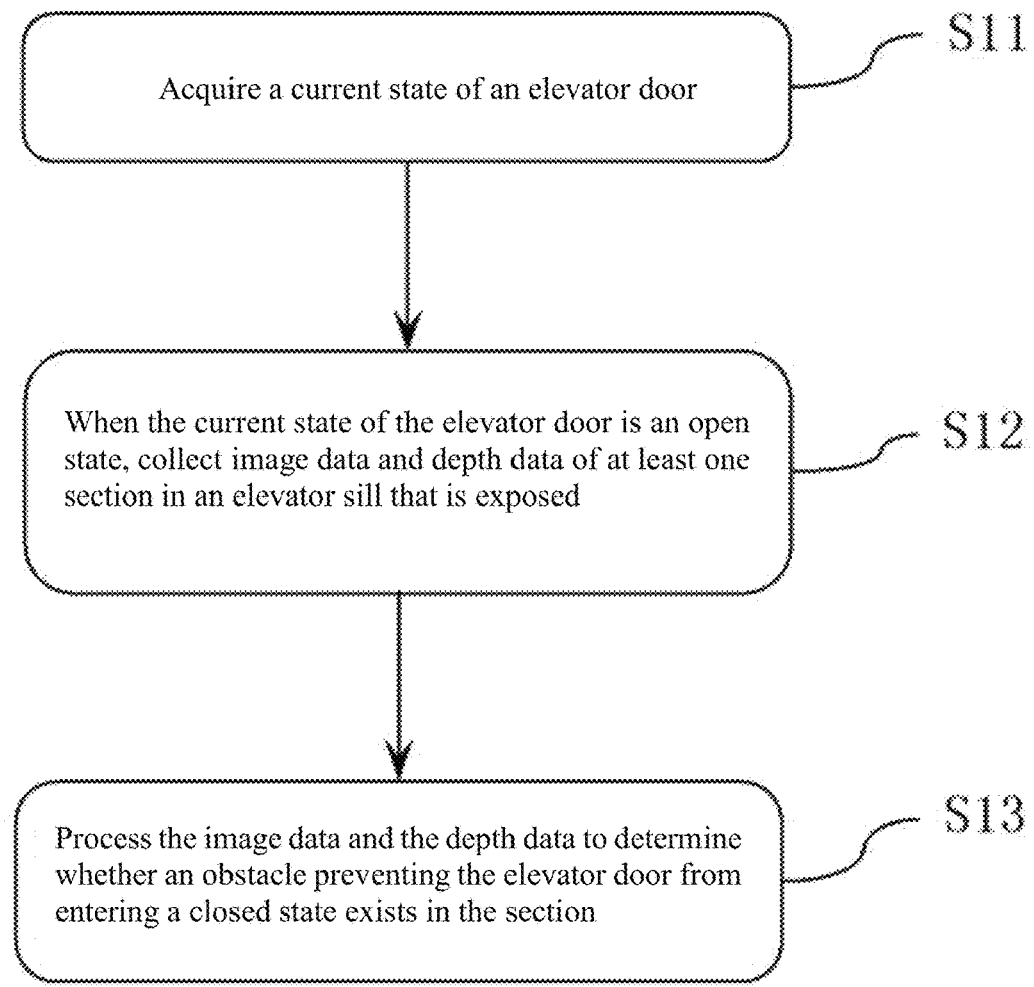
FIG. 5 is a schematic flowchart of an embodiment of a method for monitoring an elevator door according to the present invention.

Moreover, as an aspect obviously superior to the prior art, a method for monitoring an elevator door is further provided in the present invention. For example, as shown in FIG. 5, an example of the method for monitoring an elevator door can include the following steps: step S11 in which a current state of the elevator door is acquired; step S12 in which image data and depth data of at least one section in an elevator sill that is exposed can be collected and acquired through, for example, one or more imaging sensors (such as an RGB-D sensor) when the current state of the elevator door is an open state; and step S13 in which the image data and depth data collected in the foregoing are processed to determine whether an obstacle preventing the elevator door from entering a closed state exists in the foregoing section.

In some embodiments, it can be determined whether an obstacle exists in a monitored section of the elevator sill in the following simple and quick manner. That is, if it can be determined that an obstacle exists in the section during processing based on the image data, or it can be determined that an obstacle exists in the section during processing based on the depth data, it can be directly determined that an obstacle has existed in the section of the current elevator sill.

In addition, in some embodiments, combined judgment analysis can be further made on the judgment result based on the image data and the judgment result based on the depth data, thus eliminating the defects and deficiencies brought by using the image-data-based manner and the depth-data-based manner separately, and achieving a more accurate and reliable final judgment result. In an actual application, specific combined judgment can be made in a variety of different manners, such as the weighting manner and the confidence comparing manner discussed in the foregoing. It can be appreciated that since such technical contents have been described in detail in the foregoing introduction of the system for monitoring an elevator door, reference can be made directly to the specific descriptions of the foregoing corresponding parts, which will not be repeated in detail here.

Besides, in some embodiments, it is also allowed in the present invention to start one or more processing operations when an obstacle has existed in the section of the current elevator sill. In addition, it can also be judged whether the elevator door is currently in an open state in many manners, thus determining whether to collect and acquire the foregoing image data and depth data. Reference can also be made directly to the detailed descriptions of the corresponding parts in the foregoing for such technical contents, and the technical contents will not be repeated.

The system for monitoring an elevator door, the elevator system, and the method for monitoring an elevator door according to the present invention are illustrated in detail in the foregoing through examples. These examples are merely used for illustrating the principles of the present invention and implementation manners thereof, rather than limiting the present invention. Those skilled in the art can make various variations and improvements without departing from the spirit and scope of the present invention. Therefore, all equivalent technical solutions should fall within the scope of the present invention and defined by claims of the present invention.

What is claims is:

1. A system for monitoring an elevator door, the elevator door having an open state or a closed state implemented by moving along an elevator sill, wherein the system for monitoring an elevator door comprises:
   one or more imaging sensors configured to collect image data and depth data of at least one section in the elevator sill that is exposed when the elevator door is in the open state; and
   a data processing device in communication with the one or more imaging sensors and configured to receive and process the image data and the depth data to determine whether an obstacle preventing the elevator door from entering the closed state exists in the section.

2. The system for monitoring an elevator door of claim 1, wherein the data processing device comprises a first module and a second module configured to respectively process the image data and the depth data to separately judge whether an obstacle exists in the section, and the data processing device is configured to determine that the obstacle has existed in the section when a judgment result of the first module or the second module is affirmative.

3. The system for monitoring an elevator door of claim 2, wherein the data processing device further comprises a third module configured to make a combined judgment on the judgment result of the first module and the judgment result of the second module, and the data processing device is configured to determine that the obstacle has existed in the section when the combined judgment result of the third module is affirmative.

4. The system for monitoring an elevator door of claim 3, wherein the combined judgment comprises: weighting the judgment result of the first module and the judgment result of the second module, and making an affirmative combined judgment result when the value obtained by the weighting exceeds a preset value; or
   comparing the confidence of the judgment result based on the image data with the confidence of the judgment result based on the depth data, and selecting the judgment result with the higher confidence as the combined judgment result.

5. The system for monitoring an elevator door of claim 2, wherein at least one of the image data is processed with color background modeling, foreground detection and morphological filtering by the first module, and the depth data is processed with 3D background structural modeling, background subtraction and morphological filtering by the second module.

6. The system for monitoring an elevator door of claim 1, wherein the data processing device is configured to output a signal when determining that the obstacle exists in the section.

7. The system for monitoring an elevator door of claim 6, wherein the signal is transmitted to a control system for controlling the operation of an elevator to perform a processing operation, and the processing operation comprises at least one of the following:
   prohibiting the elevator door from moving;
   alerting a passenger in an elevator car;
   sending a working staff a notification that an obstacle exists in the section; and
   publishing in an announcement area the notification that an obstacle exists in the section.

8. The system for monitoring an elevator door of claim 1, wherein the one or more imaging sensors are arranged at at least one of the top of an elevator car, the bottom of the elevator car, in an elevator door frame and in an elevator waiting area.

9. The system for monitoring an elevator door of claim 1, wherein the elevator door is at least one of a landing door and a car door.

10. The system for monitoring an elevator door of claim 1, wherein the one or more imaging sensors comprise one or more RGB-D sensors.

11. An elevator system, comprising the system for monitoring an elevator door of claim 1.

12. A method for monitoring an elevator door, the elevator door having an open state or a closed state implemented by moving along an elevator sill, wherein the method for monitoring an elevator door comprises:
   acquiring a current state of the elevator door;
   collecting image data and depth data of at least one section in the elevator sill that is exposed when the current state of the elevator door is the open state; and
   processing the image data and the depth data to determine whether an obstacle preventing the elevator door from entering the closed state exists in the section.

13. The method for monitoring an elevator door of claim 12, wherein it is determined that the obstacle has existed in the section when one of the following conditions is met:
   it is judged that the obstacle exists in the section during processing based on the image data; and
   it is judged that the obstacle exists in the section during processing based on the depth data.

14. The method for monitoring an elevator door of claim 12, wherein at least one of the image data is processed by color background modeling, foreground detection and morphological filtering, and the depth data is processed by 3D background structural modeling, background subtraction and morphological filtering.

15. The method for monitoring an elevator door of claim 12, wherein processing the image data and the depth data comprises: making a combined judgment on a judgment result based on the image data and a judgment result based on the depth data to determine that the obstacle exists in the section.

16. The method for monitoring an elevator door of claim 15, wherein the combined judgment comprises: weighting the judgment result based on the image data and the judgment result based on the depth data, and determining that the obstacle has existed in the section when the value obtained by the weighting exceeds a preset value; or comparing the confidence of the judgment result based on the image data with the confidence of the judgment result based on the depth data, and selecting the judgment result with the higher confidence as the combined judgment result.

17. The method for monitoring an elevator door of claim 12, further comprising:

starting a processing operation when it is determined that the obstacle exists in the section, wherein the processing operation comprises at least one of the following:

prohibiting the elevator door from moving;

alerting a passenger in an elevator car;

sending a working staff a notification that an obstacle exists in the section; and publishing in an announcement area the notification that an obstacle exists in the section.

18. The method for monitoring an elevator door of claim 12, wherein the image data and the depth data are collected by one or more imaging sensors, and the one or more imaging sensors comprise one or more RGB-D sensors.

19. The method for monitoring an elevator door of claim 18, wherein it is determined according to at least one of the image data and the depth data collected by the imaging sensor in real time whether the elevator door is already in the open state; or it is determined according to a signal acquired from a control device for controlling the operation of an elevator whether the elevator door is already in the open state.

* * * * *